(12) United States Patent
Gretz

(10) Patent No.: US 6,670,553 B1
(45) Date of Patent: Dec. 30, 2003

(54) SNAP ENGAGEMENT ELECTRICAL FITTING FOR EMT

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 10/286,228

(22) Filed: Nov. 1, 2002

Related U.S. Application Data

(63) Continuation-in-part of application No. 10/256,641, filed on Sep. 27, 2002, which is a continuation-in-part of application No. 10/053,076, filed on Jan. 17, 2002, and a continuation-in-part of application No. 09/792,184, filed on Feb. 23, 2001, now Pat. No. 6,604,400, which is a continuation-in-part of application No. 09/603,756, filed on Jun. 26, 2000, now Pat. No. 6,335,488, which is a continuation of application No. 09/165,530, filed on Oct. 2, 1998, now Pat. No. 6,080,933, which is a continuation-in-part of application No. 09/007,532, filed on Jan. 15, 1998, now Pat. No. 6,043,432.

(51) Int. Cl.[7] .................................................. H02G 3/18
(52) U.S. Cl. .............. 174/65 R; 174/65 G; 174/152 G; 174/135; 16/2.1; 248/56
(58) Field of Search .......................... 174/65 R, 65 SS, 174/65 G, 135, 152 G, 153 G; 248/56; 439/439, 460, 98, 92; 16/2.1; 29/450; 285/194, 921, 154.1, 140.1

(56) References Cited

U.S. PATENT DOCUMENTS 4,468,535 A * 8/1984 Law .......................... 174/65 R
4,619,332 A * 10/1986 Sheehan .................... 174/65 R
5,373,106 A    12/1994 O'Neil et al.
5,728,971 A     3/1998 Nash
5,774,934 A *  7/1998 Fujita et al. ................... 16/2.1
6,043,432 A     3/2000 Gretz
6,114,630 A *  9/2000 Gretz ........................ 174/65 R
6,335,488 B1    1/2002 Gretz

* cited by examiner

Primary Examiner—Dhiru R Patel

(57) ABSTRACT

A fitting that provides snap-in engagement of EMT to a panel. The fitting includes a hollow, tubular, electrically conductive electrical connector including a fastening arrangement on the leading end to allow snap-in engagement to a panel and a resilient, electrically conductive, cylindrical-shaped split ring within the trailing end to allow snap-in engagement of EMT. A plurality of locking tangs on the split ring are lanced longitudinally and bent inwardly to a smaller diameter than the outer diameter of EMT that the fitting will be used in conjunction with. Arcuate edges included on the leading ends of the locking tangs dig into the outer surface of the EMT thereby holding it fast to the trailing end of connector. The large contact area between the locking tangs and the EMT provide a large amount of surface contact between the locking tangs and the EMT, thereby improving continuity and lowering the millivolt drop. The fastening arrangement on the leading end of the fitting is typically a split ring affixed to the nose of the connector.

14 Claims, 5 Drawing Sheets

SNAP ENGAGEMENT ELECTRICAL FITTING FOR EMT

This application is a Continuation-In-Part of U.S. patent application Ser. No. 10/256,641, filed Sep. 27, 2002 and still pending which is a Continuation-In-Part of U.S. patent application Ser. No. 10/053,076, filed Jan. 17, 2002 and still pending and is a Continuation-In-Part of U.S. patent application Ser. No. 09/792,184, filed Feb. 23, 2001 now U.S. Pat. No. 6,604,400 which is a Continuation-In-Part of U.S. patent application Ser. No. 09/603,756, filed Jun. 26, 2000 now U.S. Pat. No. 6,335,488 which is a Continuation of U.S. patent application Ser. No. 09/165,530, filed Oct. 2, 1998, now U.S. Pat. No. 6,080,933 which is a Continuation-In-Part of U.S. patent application Ser. No. 09/007,532, filed Jan. 15, 1998, now U.S. Pat. No. 6,043,432.

FIELD OF THE INVENTION

This invention relates to fittings for connecting electrical metallic tubing (EMT) to a panel and specifically to an improved fitting that allows EMT to be snap fitted into the fitting to provide a quick and easy connection to a panel.

BACKGROUND OF THE INVENTION

Historically, electrical metal tubing (EMT) was connected to electrical boxes by a tubular fitting including a leading end with a threaded nose for insertion into a circular aperture in the box and a trailing end including a screw mounted laterally through the fitting wall for securing the EMT to the fitting. This arrangement, although providing an adequate means for securing EMT to boxes, junctions, and various electrical housings, is time consuming. For every connection, an installer must first stab the leading end of the fitting into the box and thread a lock nut onto the threaded nose to secure the fitting to the box and, secondly, secure the EMT to the trailing end of the fitting by tightening the laterally mounted screw through the fitting wall. For any given installation of EMT in a building or factory, electrical contractors may be required to make hundreds or even thousands of such connections to completely wire the building. Additionally, tools must typically be used to achieve a secure connection, including a wrench on the lock nut and a screw on the laterally mounted screw. Therefore, it should be appreciated that completing all of these connections can be very time consuming, with the contractors typically using both a wrench and a screwdriver on each connection.

Recently, snap engagement fittings have become popular as a means of connecting cables or EMT to electrical junction boxes. One such type of snap fitting is disclosed in U.S. Pat. No. 5,373,106 (hereinafter the '106 patent) issued Dec. 13, 1994, and entitled "Snap In Cable Connector". This patent disclosed a quick connect fitting for an electrical junction box including a split ring member that improved the ease of use and reduced the time involved in securing electrical fittings to electrical junction boxes. However, the fitting of the '106 patent included the traditional method of securing the EMT or cable to the trailing end of the fitting, thereby requiring the use of a screwdriver to complete the connection on the trailing end.

Although inclusion of a split ring on the leading end of the fitting in the '106 patent reduced installation time for the fitting to the box, it did not reduce installation time at the trailing end of the fitting, in which the EMT is secured to the fitting in the traditional manner. Therefore, what is needed is a fitting for securing EMT to panels and the like that does not require the use of any tools, at either the leading or trailing end, and that allows the leading end to be snap fitted into the panel and the EMT to be snap fitted into the trailing end. A fitting that allows snap engagement at both ends of the fitting, without the use of tools, would vastly reduce the time involved for installing EMT in a structure. Additionally, the fitting should be designed to work with standard electrical panels, boxes, housings, etc., including snap fit engagement with standard size knockout apertures.

These and other advantages will become apparent by reading the attached specification and claims in conjunction with reference to the attached drawings.

SUMMARY OF THE INVENTION

The present invention comprises a fitting that provides a trailing end designed for snap-in engagement of EMT. The fitting comprises a hollow, tubular, electrically conductive electrical connector having a leading for connecting to a panel and a trailing end for connecting to EMT. A fastening arrangement is provided on the leading end to allow snap-in engagement to a panel. A resilient, electrically conductive, cylindrical-shaped split ring is secured within the trailing end of the connector. A plurality of locking tangs are lanced longitudinally and bent inwardly to a smaller diameter than the outer diameter of EMT that the fitting will be used in conjunction with. Arcuate edges are included on the leading ends of the locking tangs. The arcuate edges are capable of digging into the outer surface of the EMT and holding it fast to the trailing end of connector. The fastening arrangement on the leading end of the fitting is typically a split ring affixed to the nose of the connector. The connector, split ring affixed to the nose of the connector, and the split ring secured within the trailing end of the connector comprise the fitting of the present invention that provides snap-in engagement on both ends of the fitting. The fitting allows the leading end of the connector to be snapped into a standard sized aperture in a panel and also allows EMT to be snapped into the trailing end of the fitting. The large contact area between the locking tangs and the EMT provide a large amount of surface contact between the locking tangs and the EMT, thereby improving continuity and lowering the millivolt drop.

Figure 1:
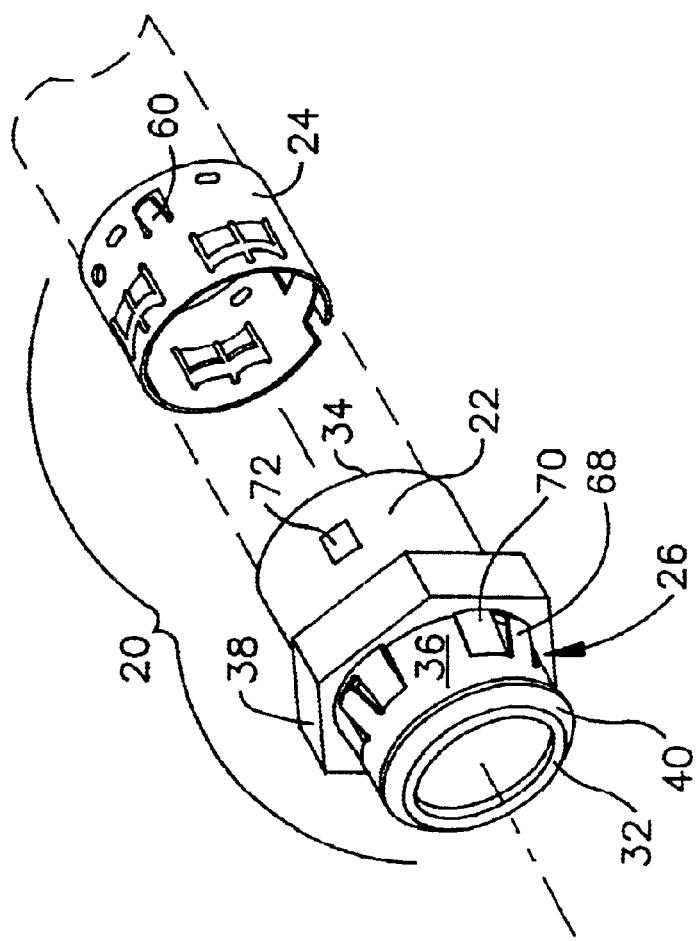
FIG. 1 is a perspective view of a preferred embodiment of the snap engagement electrical fitting according to the present invention in alignment with an electrical box and with the snap ring exploded away from the connector.

INDEX TO REFERENCE NUMERALS IN DRAWINGS 20 snap engagement electrical fitting
22 hollow electrical connector
24 split ring
26 fastening arrangement
28 aperture
30 junction box
32 leading end of connector
34 trailing end of connector
36 electrically conductive snap ring
38 central flange
40 leading flange
42 blank
44 leading edge of split ring
46 trailing edge of split ring
48 M-shaped slot
50 locking tang
52 trailing end of locking tang
54 leading end of locking tang
56 arcuate edge
58 U-shaped slot
60 securing tab
62 stabilizer
64 leading end of securing tab
66 trailing end of securing tab
68 panel engagement tangs
70 grounding tangs
72 window
74 leading end of fitting
76 trailing end of fitting
78 EMT (electrical metallic tubing)
80 inner, wall of split ring
82 end of stabilizer
84 circular engagement surface

DETAILED DESCRIPTION OF THE INVENTION

The present invention comprises a fitting for connecting EMT to a panel or junction box and providing snap-fit engagement of the leading end of the fitting with a panel and snap-fit engagement of EMT to the trailing end. This invention relates to and incorporates herein by reference in its entirety U.S. patent application Ser. No. 10/256,641, filed Sep. 27, 2002, pending U.S. patent application Ser. No. 10/053,076 filed Jan. 17, 2002, pending U.S. patent application Ser. No. 09/792,184, filed Feb. 23, 2001, U.S. Pat. No. 6,335,488 issued Jan. 1, 2002, U.S. Pat. No. 6,080,933 issued Jun. 27, 2000, and U.S. Pat. No. 6,043,432 issued Mar. 28, 2000.

Referring to FIG. 1, there is shown a preferred embodiment of the snap engagement electrical fitting 20 for EMT according to the present invention. The snap engagement fitting 20 includes a hollow, tubular, electrically conductive electrical connector 22, a resilient, electrically conductive, cylindrical-shaped split ring 24, and a fastening arrangement 26 for snap engagement with an aperture 28 in a panel or junction box 30. The electrical connector 22 includes a leading end 32 facing the box 30 and a trailing end 34 facing away from the box. A preferred embodiment of the fastening arrangement 26 includes an electrically conductive snap ring 36 disposed on the leading end 32 of the connector 22 between a central 38 and a leading 40 flange. The split ring 24 fits within the hollow interior of the trailing end 34 of the tubular connector 22 as will be described herein.

Figure 2:
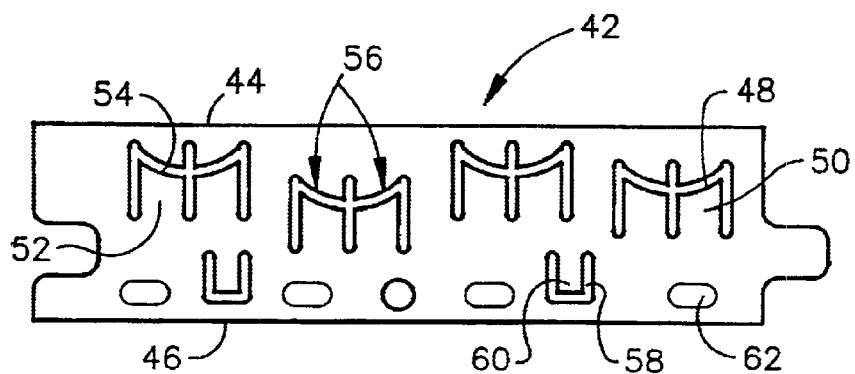
FIG. 2 is a plan view of a blank that will be formed into the cylindrical snap ring.

The cylindrical-shaped split ring is formed from a flat piece or blank 42 of spring steel as shown in FIG. 2. Details of the split ring will be described with reference to its eventual alignment with the junction box. The edge 44 of the blank 42 shown on the top of FIG. 2 will therefore become the leading edge 44 of the split ring after it is formed into its cylindrical shape and the opposite edge is the trailing edge 46. In the preferred embodiment of the blank 42 shown in FIG. 2, four M-shaped slots 48 are cut in the blank to form eight locking tangs 50 arranged substantially along the length of the blank near the leading edge 44. The locking tangs 50 include a trailing end 52 that is integral with the blank and a free leading end 54 that include arcuate edges 56. The arcuate edges 56 have radii that will maximize surface contact of the arcuate edges with the particular standard sized EMT that they will be used in conjunction with. It should be noted that the pairs of locking tangs 50 are staggered different distances from the leading edge 44, with the first and third pairs of locking tangs 50, as numbered from the left to right hand side of FIG. 2, closer to the leading edge 44 than the second and fourth pairs of locking tangs 50. This will insure that, once the split ring 24 is formed into its cylindrical shape, such as shown in FIG. 3, the pairs equidistant from the leading edge will be approximately opposite each other across the split ring 24.

As shown in FIG. 2, the preferred embodiment of the blank 42 includes two U-shaped slots 58 near the trailing edge 46 that define securing tabs 60. Four stabilizers 62 have also been formed in the blank 42 near the trailing edge 46.

Figure 3:
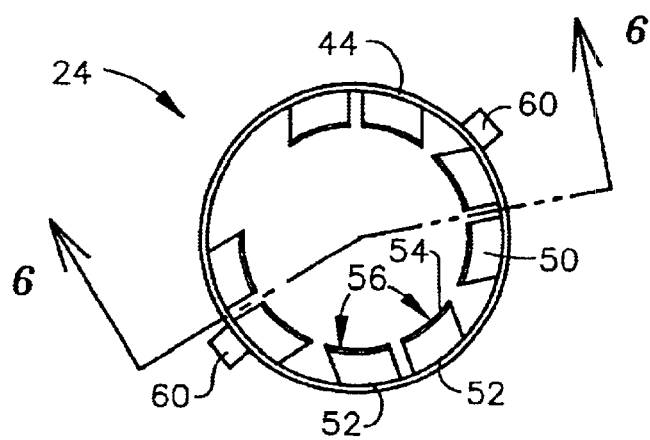
FIG. 3 is a front end view of the preferred embodiment of the cylindrical snap ring, or view from the leading end of the ring or the end facing the box in FIG. 1.

FIG. 3 depicts the blank 42 of FIG. 2 after it has been formed into its cylindrical-shaped split ring 24 as viewed from the leading end 44. The locking tangs 50 have been bent with the arcuate edges 56 of the free ends 54 facing inwards as shown. The trailing ends 52 of the locking tangs 50 are cantilevered from the split ring 24. The securing tabs 60 are bent outwards of the ring.

Figure 4:
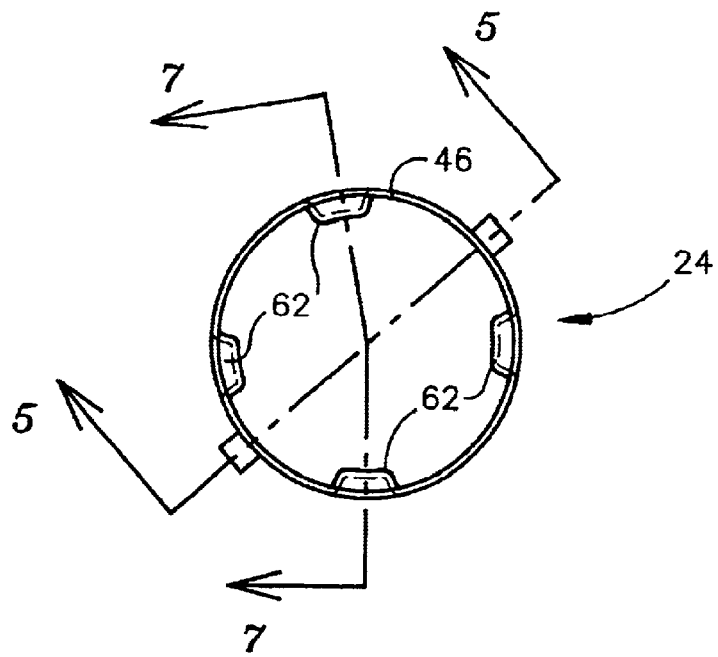
FIG. 4 is a back end view of the preferred embodiment of the cylindrical snap ring, or view from the end of the ring facing away from the box in FIG. 1.

Referring now to FIG. 4, the cylindrical-shaped split ring 24 as viewed from the trailing end 46 shows the stabilizers 62, which are raised areas pressed inwards of the ring near the trailing edge 46. The stabilizers 62 narrow the effective inner diameter of the split ring 24 near the trailing edge 46.

Figure 5:
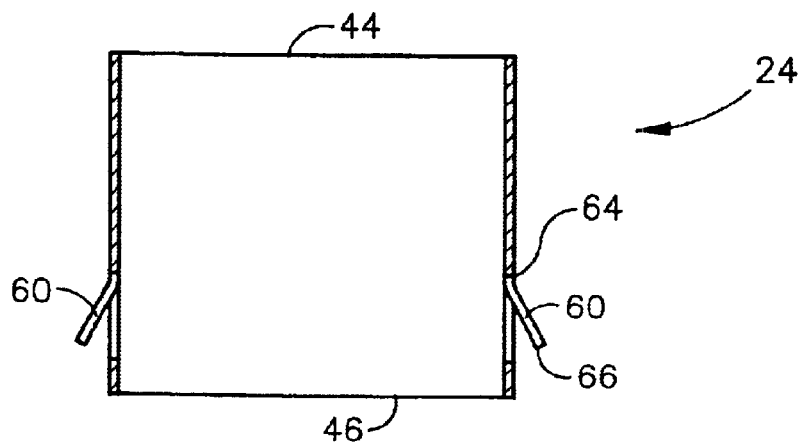
FIG. 5 is a sectional view of the snap ring taken along line 5—5 of FIG. 3.

As shown in the sectional view of the split ring 24 in FIG. 5, the securing tabs 60 are bent outwards of the split ring 24 and include a leading end 64 cantilevered from the ring and a free end 66. Two securing tabs 60 are depicted in the preferred embodiment of the split ring 24.

Figure 6:
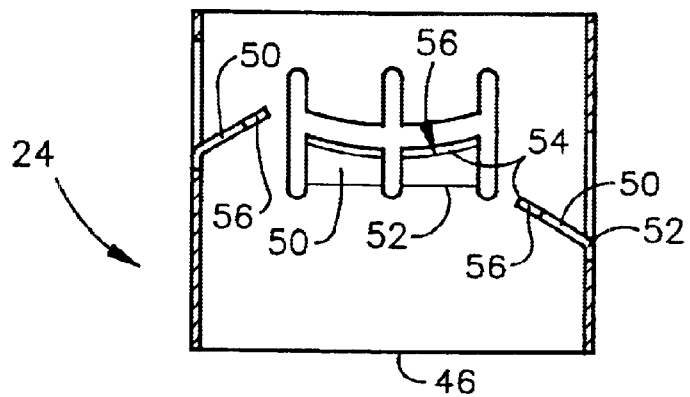
FIG. 6 is a sectional view of the snap ring taken along line 6—6 of FIG. 3.

The sectional view of the split ring 24 in FIG. 6 depicts the locking tangs 50 bent inwards of the ring. The locking tangs 50 include a trailing end 52 that is cantilevered from the split ring 24 and a free leading end 54 that extends inwards of the ring. The locking tangs 50 include sharp arcuate edges 56 that point toward the leading edge 44 of the split ring 24 as shown.

Figure 7:
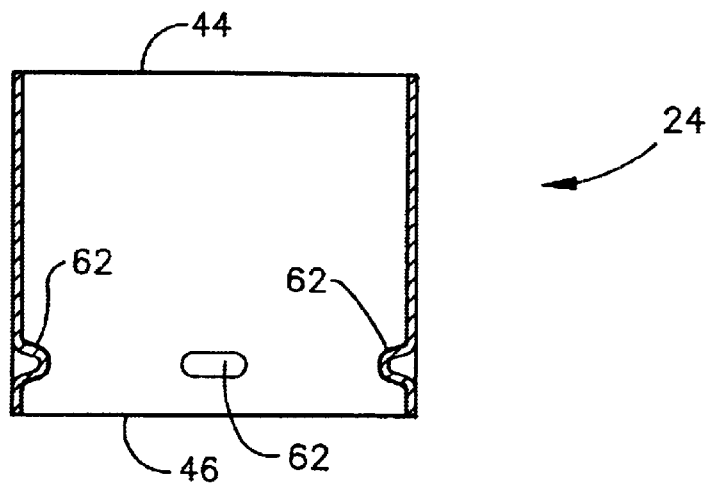
FIG. 7 is a sectional view of the snap ring taken along line 7—7 of FIG. 4.

Referring to FIG. 7, the stabilizers 62 are raised areas in the wall of the split ring 24. The stabilizers 62 are located near the trailing edge 46 of the split ring 24 and will serve to reduce the effective diameter of the trailing end of the split ring 24.

Figure 8:
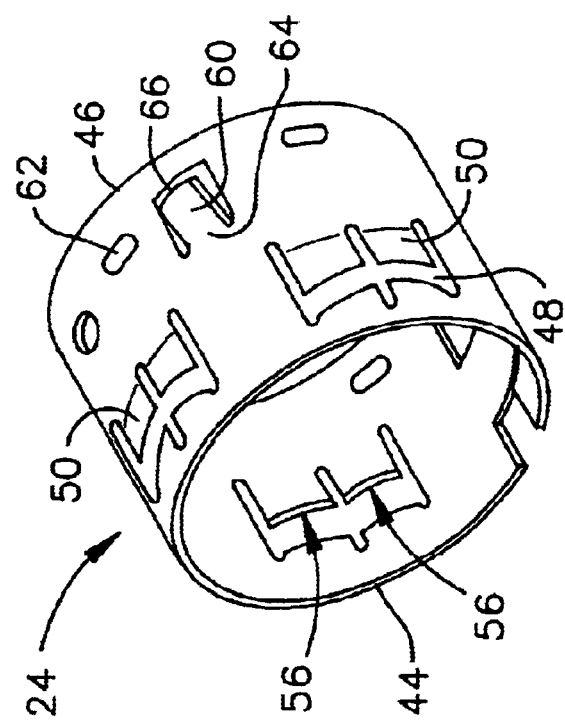
FIG. 8 is a perspective view of the snap ring of FIG. 3, from the front side of the ring.

FIG. 8 depicts a perspective view of the split ring 24 as viewed from the leading end 44. The locking tangs 50 are spaced around the periphery of the split ring 24 near the leading end 44 and include arcuate edges 56 that extend inward of the ring and are directed toward the leading end 44. Securing tabs 60 include leading ends 64 that are cantilevered from the split ring 24 and free trailing ends 66.

Figure 9:
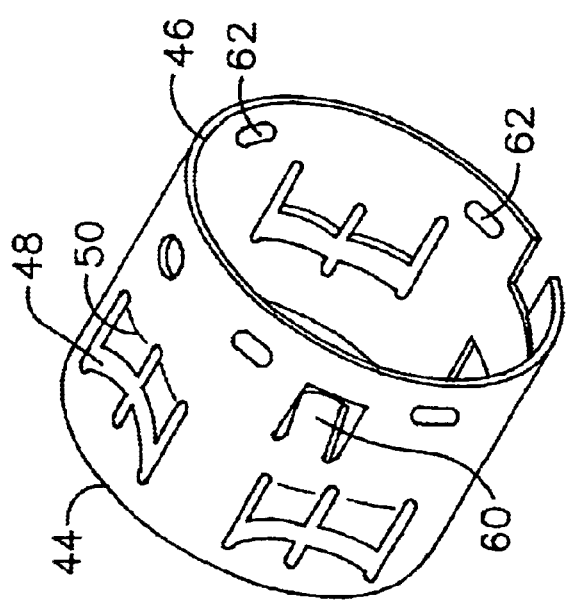
FIG. 9 is a perspective view of the snap ring of FIG. 4, from the back side of the ring.

FIG. 9 depicts a perspective view of the split ring 24 as viewed from the trailing end 46. The stabilizers 62 project into the inner bore through the split ring 24 and reduce the effective diameter at the trailing end 46.

The operation of the snap engagement electrical fitting may best be understood by reference to FIG. 1. The fitting 20 typically includes a hollow, tubular, electrically conductive connector 22 that having a central 38 and leading 40 flange. A securing arrangement on the leading end 32 of the connector typically consists of an electrically conductive snap ring 36. The snap ring 36 is typically constructed of spring steel and is formed to a smaller diameter than the leading end 32 of the connector 22 between the two flanges 38 and 40. The snap ring 36, being constructed of the resilient spring steel, therefore is typically slid over the leading flange 40 and snaps to its relaxed diameter over the leading end of the connector. The snap ring 36, thus seated on the leading end 32 of the connector 22, forms a fastening arrangement 26 for securing the leading end of the connector 22 to a panel. In the preferred embodiment of the fastening arrangement 26 as depicted in FIG. 1, the snap ring 36 includes outward bent panel engagement tangs 68 and grounding tangs 70.

On its trailing end 34, the tubular bore of the electrically conductive connector 22 includes windows 72 into which securing tabs 60 extend from the electrically conductive split ring 24. The electrically conductive split ring 24 is formed to a larger diameter than the interior diameter of the trailing end 34 of the connector 22. Therefore, the split snap ring 24 may be secured to the trailing end 34 of the connector 22 by compressing the ring 24 from its relaxed diameter to a smaller diameter and inserting the ring 24 in such a manner that the securing tabs 60 align with the windows 72 in the connector 22. After being inserted into the hollow trailing end 34 of the connector 22, the split ring 24 may be released, and, being constructed of spring steel, will spring back to the diameter of the hollow trailing end 34, whereupon the securing tabs 60 lock into the windows 72 and secure the split ring 24 to the connector 22.

Figures 10, 11:
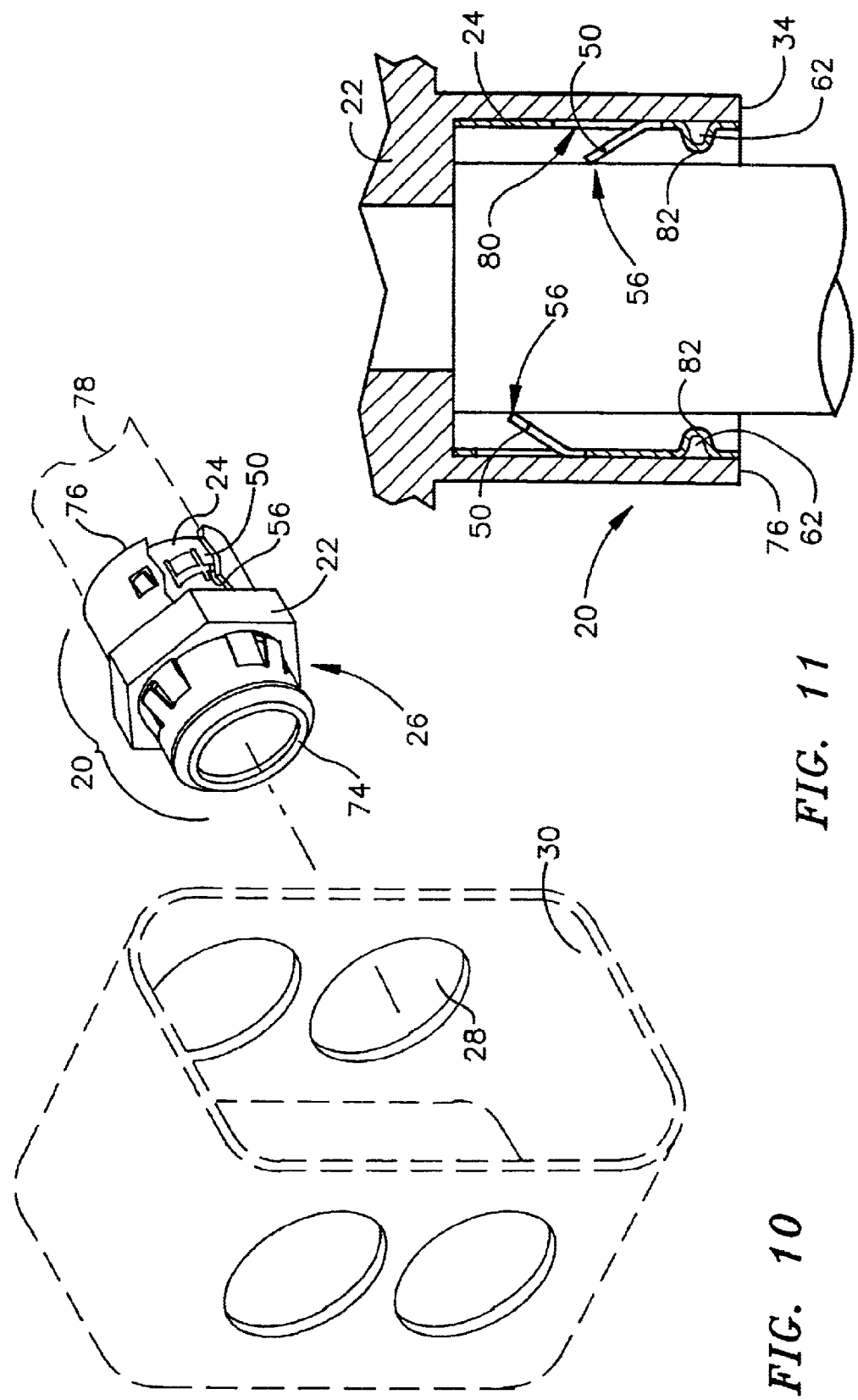
FIG. 10 is a perspective view of the snap engagement electrical fitting according to the present invention in alignment with an electrical box and with a portion of the trailing end of the connector cut away to reveal portions of the split ring inserted in the trailing end.
FIG. 11 is a sectional view of the trailing end of the fitting with electrical metallic tubing secured therein.

As shown in FIG. 10, the snap engagement electrical fitting 20 according to the present invention consists of the connector 22, the split ring 24 disposed within the trailing end 34 of the connector 22, and the fastening arrangement 26 on the leading end 32 of the connector 22.

With reference to FIG. 10, the fitting 20 of the present invention is operated by simply snapping the leading end 74 of the fitting 20 into an appropriately sized knockout aperture 28 in a panel or junction box 30. After the leading end 74 of the fitting 20 is secured to the box 30, Electrical metallic tubing 78 is then simply inserted into the trailing end 76 of the fitting 20 until the EMT 78 is inserted past the locking tangs 50 of the split ring 24. The arcuate edges 56 of the locking tangs 50 dig into the outer surface of the EMT 78 and secure it within the trailing end 76 of the fitting 20. As should be appreciated by those skilled in the art, the snap engagement electrical fitting 20 according to the present invention simplifies the task of connecting EMT to panels, junction boxes, and the like. The fitting of the present invention saves time over prior art fittings by eliminating the time required to fasten locking nuts on the leading end of the connector to fasten it to a panel or to tighten lateral screws on the trailing end of the connector to secure the EMT.

FIG. 11 depicts a sectional view of the trailing end 76 of the fitting 20 after EMT 78 has been secured therein. EMT with a nominal conduit size of ½-inch has an outer diameter of 0.706 inch. The locking tangs 50 typically are at an angle of 60° from the walls of the split ring 24 and extend into the inner bore of the split ring to an extent such that the distance between the opposing arcuate edges 56 of the locking tangs 50 is typically 0.645 inch. The distance between the opposing arcuate edges 56 of the locking tangs 50 is therefore approximately 0.060 inch less than the outer diameter of the conduit 78. Insertion of the ½-inch conduit 78 into the trailing end 76 of the fitting 20 therefore deflects the locking tangs 50 and displaces them 0.030 inch toward the inner wall 80 of the split ring 24, or a total deflection of approximately 0.060 inch for the opposing locking tangs. After insertion of the EMT 78, the locking tangs 50 are typically at an angle of 45° with respect to the inner wall 80. The arcuate edges 56, which extend substantially around the outer perimeter of the EMT 78, bite into the outer wall of the EMT and hold it fast within the fitting 20. As the EMT 78 is inserted into the fitting 20, the split ring 24 is restrained from expanding in diameter by the inner wall 80 of the trailing end 76 of the fitting 20. The stabilizers 62 extend into the inner bore of the split ring 24 such that the opposing ends of the stabilizers 82 are typically 0.730 inch apart. Insertion of the 0.706 inch diameter EMT 78 therefore allows a clearance of 0.024 inch on each side of the conduit. The stabilizers thus act to restrain the inserted conduit from sideways movement caused by a force applied to some portion of the conduit 78.

As shown in FIG. 3, the arcuate edges 56 on the locking tangs 50 form a circular engagement surface 84 for engaging the outer periphery of the conduit (not shown). The radii of the arcuate edges 56 preferably approximate the radius of the conduit (EMT) that it will be used in conjunction with. For a ½-inch nominal size conduit then, with an outer diameter of 0.706 inch, the radius of curvature of the conduit is therefore 0.353 inch. The radius of curvature of each arcuate edge 56 in the preferred embodiment is preferably 0.323 inch. When the locking tangs 50 engage a conduit 78, such as shown in FIG. 11, the engaged locking tangs 50 are at an angle of approximately 45° to the wall 80, and the radius of the arcuate edges 56 are selected to maximize surface contact with the outer periphery of the conduit 78 at the selected angle of engagement.

The material of construction of the split ring is typically hardened spring steel. A preferred material of construction is AISI (American Iron and Steel Institute) 1050 CRS (cold rolled steel), annealed #3 edge, hardened to Rc 42–44, zinc plated to 0.0005" thick minimum. With a Rockwell C hardness of 42–44, the arcuate edges 56 of the locking tangs 50 easily penetrate the outer surface of the conduit 78 that is typically manufactured to the standards of the National Electrical Code (Article 348 of the NEC). A typical thickness for the split ring 24 is 0.020 inch, which insures that the arcuate edges are sharp enough to penetrate the softer EMT 78.

Displacement of the locking tangs as described herein and the intimate contact of the arcuate edges on the inserted conduit create a connection between the box and the conduit that exhibits improved continuity and lowers the millivolt drop across the fitting. The locking tangs and arcuate edges also serve to lock the conduit within the fitting, thereby providing proper strain relief to the conduit and preventing accidental withdrawal of the conduit from the fitting and box. Use of the fitting saves a lot of time over traditional prior art fittings, as snap in engagement on both ends of the fitting eliminates the need for manual manipulation of tools to connect the prior art device.

Electrical metallic tubing of course is supplied in a myriad of nominal conduit sizes. The snap engagement electrical fitting of the present invention can therefore be produced in a myriad of sizes to accommodate the various conduit sizes. Although the relative sizes of the connector and split ring will vary with the conduit size, the principle of controlling the angle of the locking tangs with respect to the wall of the split ring and the sideways displacement of the locking tangs to create a hold on the inserted conduit remains the same. Additionally, the fastening arrangement including the electrically conductive snap ring can be varied in size to fit different standard aperture sizes that are typically provided for EMT connection to panels, boxes, and the like.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A fitting for securing electrical metallic tubing to a panel comprising:
   a hollow, tubular, electrically conductive electrical connector including a leading end, a trailing end, a central bore, and a fastening arrangement on said leading end for fastening said connector to an aperture in a panel;
   a resilient, electrically conductive, cylindrical-shaped split ring secured within said trailing end, said split ring having a longitudinal axis there through;
   a securing arrangement on said trailing end for resisting removal of said split ring from said connector;
   a plurality of locking tangs lanced longitudinally from said split ring, said locking tangs bent inwardly from said split ring thereby forming a trailing end cantilevered from said split ring and a free leading end;
   said locking tangs bent inwardly to a smaller diameter than the outer diameter of an electrical metallic tube that said fitting will be used in conjunction with; and
   arcuate edges on said leading ends of said locking tangs, said arcuate edges capable of digging into said tube.

2. The fitting of claim 1 wherein said arcuate edges on said locking tangs form a circular engagement surface for engaging said tubing.

3. The fitting of claim 2 wherein said split ring includes a total of eight of said locking tangs.

4. The fitting of claim 1 wherein said split ring is formed of spring steel to a thickness of 0.020 inch.

5. The fitting of claim 4 wherein said spring steel is AISI (American Iron and Steel Institute) 1050 CRS (cold rolled steel), annealed #3 edge, hardened to a Rockwell C hardness of between 42 and 44.

6. The fitting of claim 1 wherein said fastening arrangement includes a seat on said leading end and an electrically conductive leading split ring disposed on said seat, said leading split ring including tangs for engaging the walls of said panel.

7. The fitting of claim 6 wherein said fastening arrangement includes panel engagement tangs for engaging said panel and grounding tangs for biasing against the walls of said aperture in said panel for providing good electrical continuity between said panel and said connector.

8. The fitting of claim 1 wherein said securing arrangement includes
   one or more securing tangs lanced longitudinally from said split ring and bent outwardly of said split ring, said securing tangs including a leading end cantilevered from said split ring and a free trailing end; and
   a complementary number of tang apertures in said trailing end of said connector, whereby compression and insertion of said split ring into said trailing end of said connector enables said securing tangs to engage said tang apertures.

9. The fitting of claim 1 wherein said securing arrangement includes an annular flange at said trailing end of said connector, said annular flange extending into said central bore, said annular flange capturing said split ring and securing it therein when said split ring is compressed and inserted therein.

10. The fitting of claim 1 wherein said locking tangs are formed in pairs, with each of said pairs staggered different distances from the edge of said split ring, and each of said pairs approximately aligning with an opposing pair across said split ring, thereby insuring that said pairs will apply pressure equally to opposing sides of said tube.

11. The fitting of claim 10 wherein said opposing pairs of said locking tangs include opposing arcuate edges that are approximately 0.060 inch less than the outer diameter of said tube.

12. The fitting of claim 1 wherein said split ring includes a leading edge and a trailing edge and a plurality of raised areas pressed inwards of said split ring near said trailing edge, said raised areas providing stabilizers for effectively narrowing the effective inner diameter of said split ring near said trailing edge and thereby stabilizing said tube from excessive movement within said trailing end.

13. The fitting of claim 1 wherein said fastening arrangement includes a threaded nose on said leading end and a threaded lock nut on said threaded nose for engaging the walls of said panel.

14. A method for quickly connecting EMT to an aperture in a panel, comprising:
   providing an electrically conductive electrical junction box with an aperture;
   providing a conduit;
   providing an electrically conductive connector having a leading end for insertion in said aperture, a trailing end for connection to said conduit, and a face limiting the distance said leading end may be inserted in said hole;
   providing an electrically conductive snap ring secured to said leading end of said connector with said snap ring having a leading portion and a trailing portion;
   providing at least one panel engagement tang on said snap ring that has a relaxed outer dimension greater than the diameter of said aperture;
   providing at least one grounding tang integral with and supported at one end from said snap ring and free at its opposite end; and
   providing a cylindrical-shaped electrically conductive split ring secured to said trailing end, said split ring including inward extending locking tangs;
   inserting said leading end of said electrical connector with said snap ring into said aperture until said crest of said panel engagement tang clears said aperture and said grounding tang draws said face of said electrical connector against said junction box; and
   inserting said conduit into said trailing end of said connector containing said split ring until said locking tangs engage the outer periphery of said conduit.

* * * * *